United States Patent [19]

Kubo et al.

[11] Patent Number: 5,227,917
[45] Date of Patent: Jul. 13, 1993

[54] LENS AND METHOD FOR PRODUCING THE SAME

[75] Inventors: Hiroyuki Kubo; Takeshi Nomura; Hiroe Tanaka, all of Tokyo; Nobukazu Yogo, Yokohama; Bunryo Sato, Hachioji, all of Japan

[73] Assignee: Canon Kabushiki Kaisha, Tokyo, Japan

[21] Appl. No.: 704,096

[22] Filed: May 22, 1991

[30] Foreign Application Priority Data

May 25, 1990 [JP] Japan .................. 2-133904

[51] Int. Cl.$^5$ ............................ G02B 3/00; G02B 7/02
[52] U.S. Cl. ..................................... 359/642; 359/811; 425/808
[58] Field of Search ............... 351/161; 359/642, 811; 65/37, 38, 39; 425/808

[56] References Cited

U.S. PATENT DOCUMENTS

| | | | |
|---|---|---|---|
| 4,836,840 | 6/1989 | Hirota et al. | 65/37 X |
| 5,015,280 | 5/1991 | Kimoto et al. | 65/37 X |
| 5,019,098 | 5/1991 | Mercier | 351/161 X |

FOREIGN PATENT DOCUMENTS

| | | |
|---|---|---|
| 58-84134 | 5/1983 | Japan . |
| 61-26528 | 2/1986 | Japan . |
| 1-105713 | 4/1989 | Japan . |
| 1-167242 | 6/1989 | Japan . |
| 62297233 | 6/1989 | Japan . |

Primary Examiner—Scott J. Sugarman
Attorney, Agent, or Firm—Fitzpatrick, Cella, Harper & Scinto

[57] ABSTRACT

A lens is manufactured by preparing a glass material, preparing a molding apparatus for pressmolding the glass material into a lens shape, preheating the glass material or heating the glass material in the molding apparatus to soften the glass material and molding the glass material into the lens shape by the molding apparatus. An engagement portion of the molded lens to a member on which the lens is to be mounted is molded in the molding process simultaneously with the molding of an optically function portion of the lens.

4 Claims, 7 Drawing Sheets

LENS AND METHOD FOR PRODUCING THE SAME

BACKGROUND OF THE INVENTION

1. Field of the Invention

The present invention relates to a mold for forming an optical element and a method of pressmolding, and more particularly to a mold for molding an optical element which enables the continuous manufacture of the optical element having a bevelled portion at a low cost and a method of press-molding using the same. The present invention further relates to a lens produced by such a molding method.

2. Related Background Art

A method for manufacturing an optical element having a high precision optical function plane, which does not need post-machining such as grinding and polishing by accommodating a material to be molded into the optical element such as a glass blank premolded to have general shape and surface precision in a mold having a predetermined surface precision and press-molding the material under heat, has been developed.

In such a press-molding method, an upper molding member and a lower molding member are slidably arranged in a molding body to face each other, a molding material is introduced into a cavity formed by the upper molding member, the lower molding member and the molding body. The molding members are heated to a molding temperature such as a temperature to render the material to $10^8$ to $10^{12}$ poise in a non-oxidization in order to prevent the molding members from being oxidized. Then, the mold is closed and the material is pressed for a proper time period to transfer the shape of the surfaces of the molding members to the surface of the material. After the temperature of the molding members is decreased to a sufficiently lower temperature than a glass transition temperature of the material, the mold is open to take out the molded optical element.

The optical element thus formed, for example, a lens abuts against a reference plane of a body tube when it is assembled into a lens-barrel. A bevelled portion may be formed on at least one outer periphery of the lens surfaces as a reference plane for the abutment. In a lens having a planar reference plane on an outer periphery of an optical function plane, bevelled portions are formed on the outermost peripheries of the reference planes on the both surfaces. The bevelled portion may also be formed to provide a clearance in the assembling or to prevent a failure of the lens.

The bevelled portion may be formed by grinding after the press-molding, but it is desirable to form the bevelled portion simultaneously upon the press-molding from standpoints of speed-up of manufacturing of the optical element and cost reduction.

In this respect, a method has been proposed, in which a molding ring member is mounted on the outer periphery of a lower molding member or an upper molding member, and the molding ring member is constructed so as to have a shape for forming the bevel at an end thereof, whereby the bevelled portion is formed in the optical element at the same time upon the press-molding (refer to Japanese Patent Application Laid-open Nos. 62-297233 and 1-167242).

However, in the above method in which the molding ring member is attached, an accuracy error due to the engagement between the ring member and the upper or lower molding member is involved. Particularly, it is difficult to attain a vertical alignment and there is the possibility of forming a flash in the press-molding. In order to avoid the above problem, it is necessary to enhance the manufacturing precision of the ring member and the upper and lower molding member. This increases the cost. Further, as the press-molding is repeatedly carried out, the engagement between the upper or lower molding member and the ring member becomes loose due to a thermal hysteresis and a mechanical stress, thereby to lower gradually the shape precision of the molded product.

SUMMARY OF THE INVENTION

It is an object of the present invention to provide a mold for molding an optical element which enables to form a bevelled portion of a high precision in the optical element simultaneously upon press-molding and does not cause the decrease of a shape precision of the molded optical element even if the press-molding is repeated.

It is another object of the present invention to provide a novel lens shape produced by a mold apparatus for molding glass material into the lens shape by heating and pressing.

It is other object of the present invention to provide a lens having an engagement portion between a lens-barrel and a lens holding member for fixing the lens to the lens-barrel when the lens is assembled into the lens-barrel, the engagement portion being molded simultaneously with an optical function plane of the lens in order to eliminate the need for post-machining after the press-molding.

It is a further object of the present invention to provide a technique for obtaining a lens having a high producibility which does not require a post-processing by heating and pressing a glass material thereby transferring simultaneously both an optical function plane of the lens and an engagement portion being engaged with a lens-barrel from a transfer plane of a molding cavity of a mold to the glass material.

In accordance with the present invention, the above objects are achieved by a mold for a molding apparatus for molding an optical element, said molding apparatus including, a lower mold member and an upper mold member accommodated in a molding member so as to slide to their longitudinal direction to said molding member, wherein transfer surfaces for forming an optical function surfaces of said optical element are formed on each facing surface of said lower mold member and said upper mold member, said mold comprising, a ring-shaped transfer portion for forming a bevelled portion of said optical element, which is formed on an outer periphery of said transfer surface of at least one of said lower mold member and said upper mold member for forming said optical function surface.

Further, in accordance with the present invention, there is provided a method for a press-molding using the mold for molding the optical element comprising the steps of pressing a softened material to be molded and filling said material into a cavity formed by said lower molding member, said upper molding member and said molding member, and molding the optical element having a thickness corresponding to a weight of said material.

Further, in accordance with the present invention, there is provided a lens produced by a method comprising the steps of: preparing a glass material; preparing a molding apparatus for press-molding said glass material into a lens shape; and preheating said glass material or heating said glass material in said molding apparatus to soften said glass material to mold said glass material into the lens shape by said molding apparatus, wherein an engagement portion of the molded lens to a mounting member on which said lens is to be mounted, is molded simultaneously with the molding of an optical function portion of said lens.

DETAILED DESCRIPTION OF THE PREFERRED EMBODIMENTS

Embodiments of the present invention are now explained with reference to the drawings.

Figure 1:
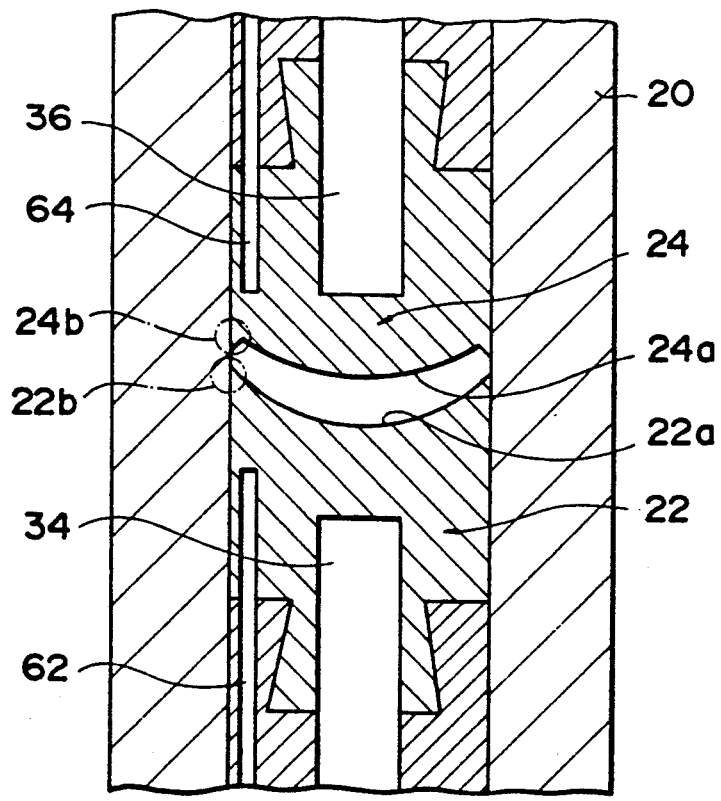
FIG. 1 shows a longitudinal sectional view of one embodiment of a mold of the present invention.
Figure 2:
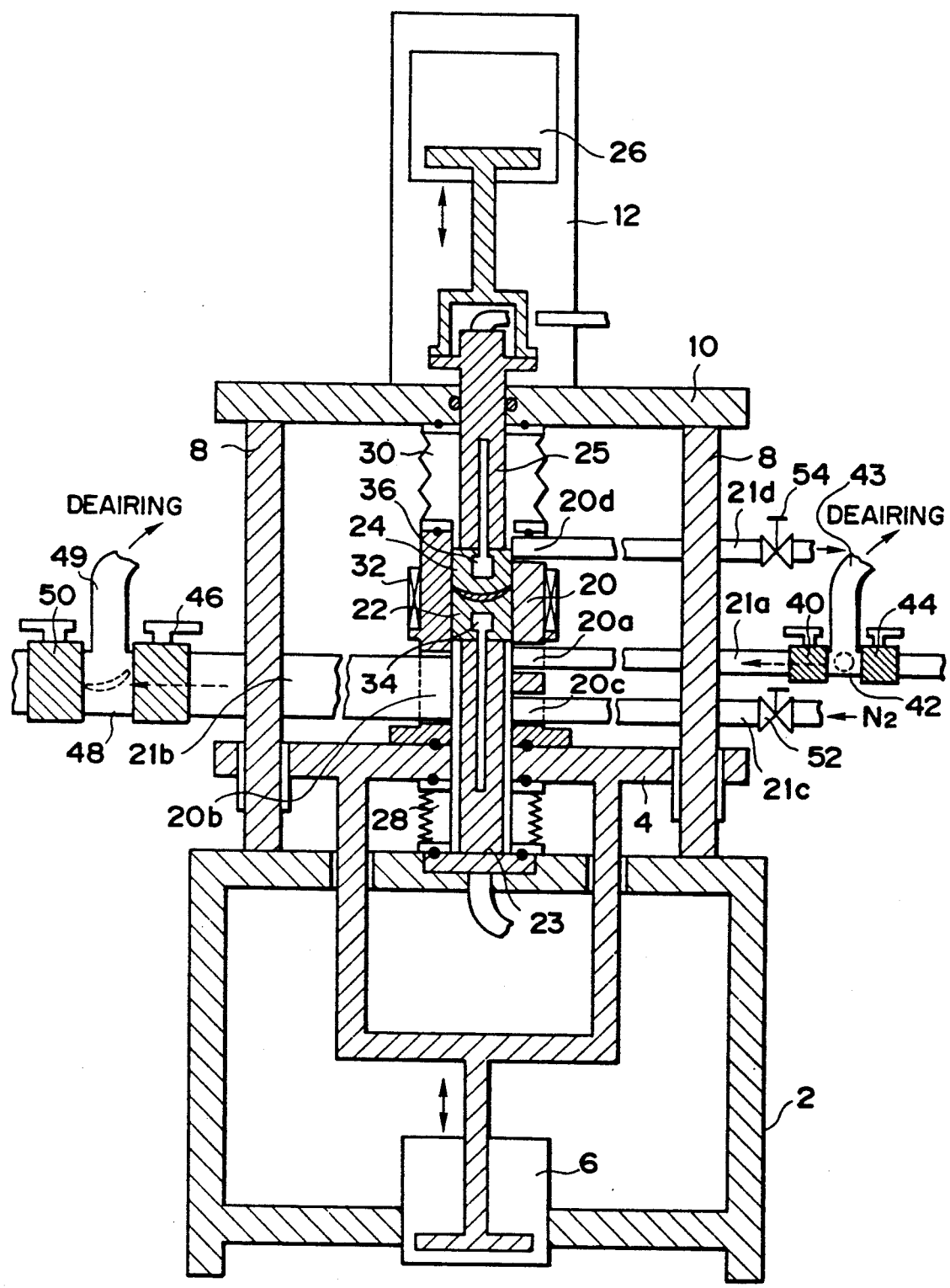
FIG. 2 shows a longitudinal sectional view of a molding apparatus using the mold of FIG. 1.
Figure 3:
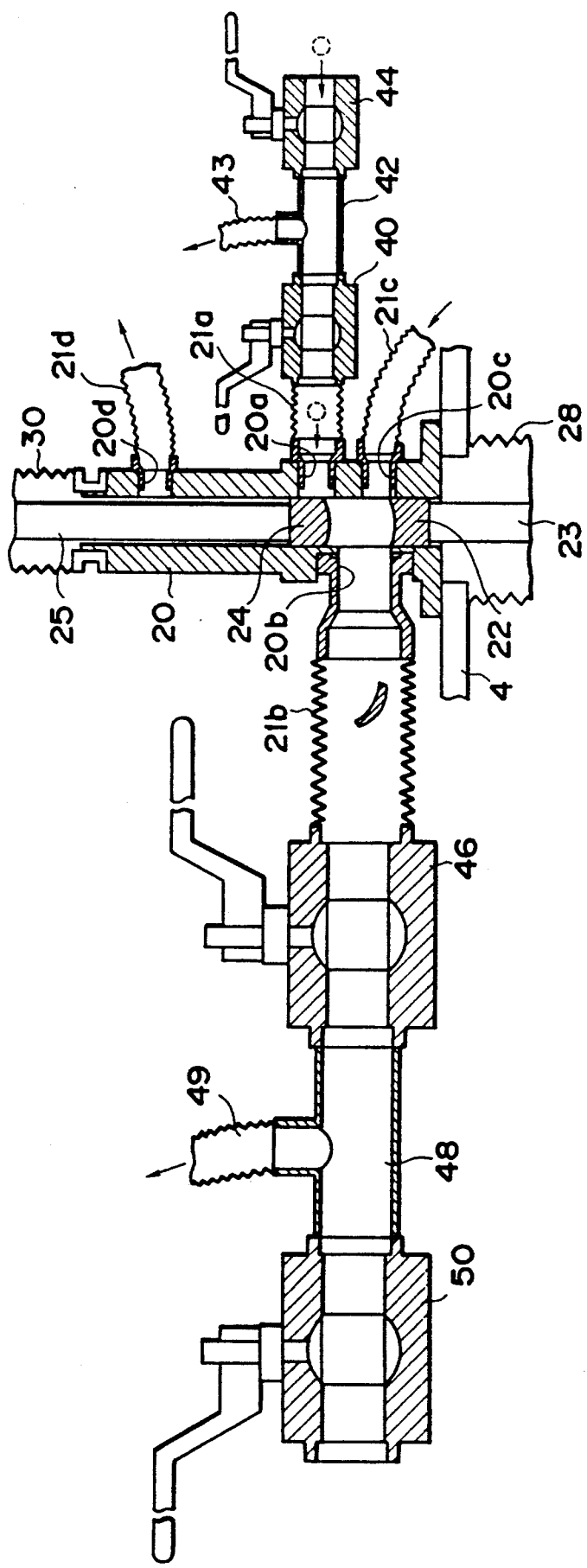
FIG. 3 shows a partial enlarged view of FIG. 2.

FIG. 1 shows a longitudinal sectional view of one embodiment of the mold of the present invention, FIG. 2 shows a longitudinal sectional view of a molding apparatus using the mold of FIG. 1, and FIG. 3 shows a partial enlarged view thereof.

The molding apparatus is first explained with reference to FIGS. 2 and 3.

Numeral 2 denotes a base on which a cylindrical support table 4 is mounted so as to slide vertically to the base 2. A cylinder 6 is mounted on the base 2 below the support table 4, and a piston rod of the cylinder 6 is connected to a lower end of the support table 4.

A support column 8 is vertically mounted on the top of the base 2. The support table 4 is engaged with the support column 8 so as to slide vertically. An upper planar plate 10 is fixed to the upper end of the support column 8 and a cylinder holder 12 is mounted on the planar plate 10.

A lower end of a cylindrical member 20 is mounted on the cylindrical support table 4. The cylindrical member 20 is vertically arranged, and a lower mold member 22 and an upper mold member 24 are vertically and slidably arranged in the cylindrical member 20. The upper end surface of the lower mold member 22 and the lower end surface of the upper mold member 24 are transfer surfaces for forming optical function planes of an optical element (lens) to be molded, and are finished to a desired surface precision. Those transfer surfaces and the inner surface of the cylindrical member 20 define a mold cavity.

A vertical support rod 23 is mounted on the bottom of the lower mold member 22. The lower end of the rod 23 is fixed to the upper surface of the base 2. A vertical support rod 25 is mounted on the top of the upper mold member 24. The upper end of the rod 25 extends through the upper planar plate 10 into the cylinder holder 12, and is mounted vertically and slidably on the planar plate 10. The top of the rod 25 is connected to a lower end of a piston rod of a cylinder 26 which is held by the cylinder holder 12.

A vertically expandable and shrinkable air tight bellows 28 is mounted around the rod 23 between the upper surface of the base 2 and the lower surface of the support table 4. Similarly, a vertically expandable and shrinkable air tight bellows 30 is mounted around the rod 25 between the upper end of the cylindrical member 20 and the lower surface of the planar plate 10.

An opening 20a for feeding a material to be molded, an opening 20b for taking out a molded optical element, an opening 20c for introducing a non-oxidization gas and an opening 20d for deairing are formed in the side wall of the cylindrical member 20, and a pipe 21a for feeding the material, a pipe 21b for taking out the molded optical element, a pipe 21c for introducing the non-oxidization gas and a pipe 21d for deairing are connected to those openings, respectively. The pipes 21a to 21d include flexible portions.

A heater 32 is mounted on the upper outer periphery of the cylindrical member 20, a heater 34 is housed in the lower mold member 22, and a heater 36 is housed in the upper mold member 24. Although not shown, an air flow type cooler may be mounted on the outer bottom of the cylindrical member 20, and cooling water circulation type coolers may be mounted on the lower mold member 22 and the upper mold member 24. Further, thermocouples for sensing temperatures may be provided on the cylindrical member 20, the lower mold member 22 and the upper mold member 24.

A material feeding side atmosphere replacement portion 42 is formed in the material feeding pipe 21a. The atmosphere replacement portion 42 has ball valves 40 and 44 on both sides thereof to permit the material to pass therethrough, and is connected to a decompression source (not shown) through a pipe 43 for deairing.

A molded optical element taking out side atmosphere replacement portion 48 is formed in the molded optical element taking-out pipe 21b. The atmosphere replacement portion 48 has ball valves 46 and 50 on both sides thereof to permit the molded optical element to pass therethrough, and is connected to a decompression source (not shown) through a pipe 49 for deairing.

The inert gas introducing pipe 21c is connected to a nitrogen gas source which is non-oxidization gas source through a valve 52. Similarly, the deairing pipe 21d is connected to a decompression source through a valve 54.

In FIG. 1, the similar elements to those shown in FIG. 2 or FIG. 3 are designated by same numerals of FIGS. 2 and 3. Numeral 62 denotes a thermo-couple for detecting a temperature of the lower mold member 22, and numeral 64 denotes a thermo-couple for detecting a temperature of the upper mold member.

As shown in FIG. 1, the transfer surface 22a (concave surface) for forming the optical function plane of the lens to be molded is formed on the upper end surface of the lower mold member 22. A ring-shaped transfer area 22b for forming a bevel of the lens to be molded is formed on the outer periphery of the transfer surface 22a. Similarly, a transfer surface 24a (convex surface) for forming the optical function plane of the lens to be molded is formed on the lower end surface of the upper mold member 24. A ring-shaped transfer area 24b for forming the bevel of the lens to be molded is formed on the outer periphery of the transfer surface 24a.

Figure 4:
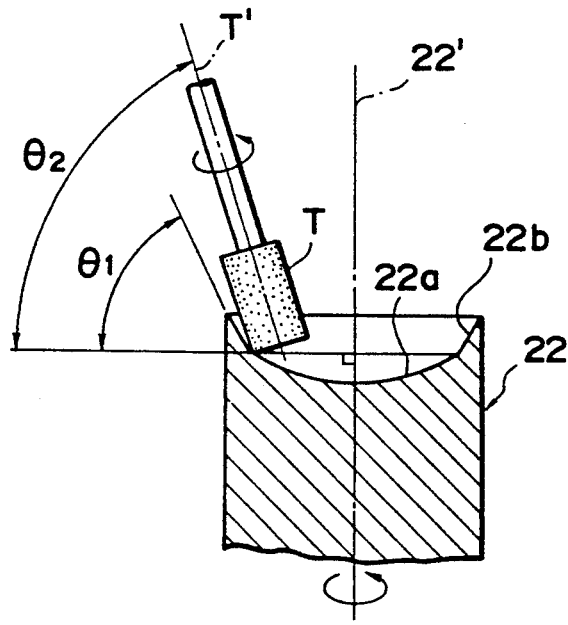
FIG. 4 shows a sectional view illustrating a process for forming a transfer surface and a transfer portion of a lower molding member.

FIG. 4 shows a sectional view illustrating a process for forming the transfer surface 22a and the transfer area 22b of the lower mold member 22.

A material consisting of MoB series ceramics and the like is molded into a predetermined shape (for example, within 3 μm of outer diameter precision and within 3 μm of eccentricity precision) to form the lower mold member 22. As the lower mold member 22 is rotated around a center axis 22' an end surface thereof is finished with NC-grinding and polishing by means of a cylindrical rotating diamond grinder T to form the transfer surface 22a and the transfer area 22b having the desired surface precision. The transfer surface 22a and the transfer area 22b may be formed with a sufficient precision by maintaining a relationship of $\theta_1 < \theta_2$ during the machining, where $\theta_1$ is an angle between a plane perpendicular to the center axis 22' of the lower mold member 22 and the transfer area 22b, and 0 is an angle between the plane perpendicular to the center axis 22' of the lower mold member 22 and the rotating center axis T' of the grinder T. In this case, a surface roughness $R_{max}$ of the transfer area 22a not more than 0.1 μm, and a surface precision not more than 5 newton rings, and a surface roughness $R_{max}$ of the transfer area 22b not more than 0.2 μm are attained, and a radius of curvature of a boundary line portion between the transfer surface 22a and the transfer area 22b is attained to be not more than 0.5 mm.

Figure 5:
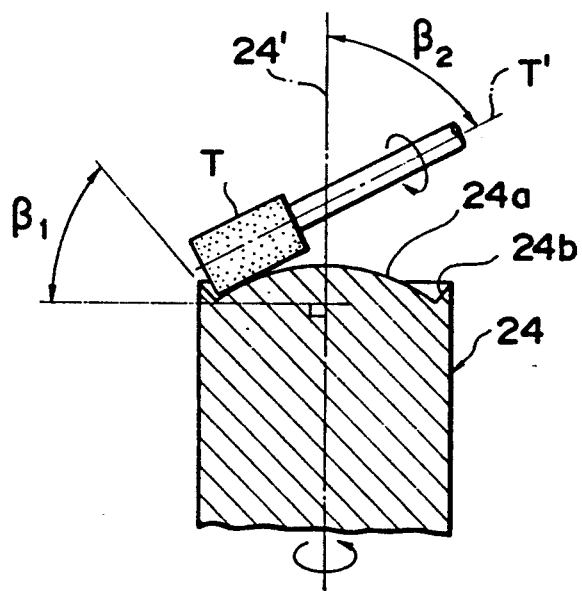
FIG. 5 shows a sectional view illustrating a process for forming a transfer surface and a transfer portion of an upper molding member.

FIG. 5 shows a sectional view illustrating a process for forming the transfer surface 24a and the transfer area 24b of the upper mold member 24.

Similarly, a MoB series ceramics material is molded into a predetermined shape (for example, within 3 μm of an outer diameter precision and within 3 μm of an eccentricity precision) to form the upper mold member 24. As the upper mold member 24 is rotated around a center axis 24', an end surface thereof is finished with NC-grinding and polishing by means of a cylindrical rotating diamond grinder T to form the transfer surface 24a and the transfer area 24b having the desired surface precision. The transfer surface 24a and the transfer area 24b can be formed with a sufficient precision if a relationship of $\beta_1 < \beta_2$ is maintained during the machining, where $\beta_1$ is an angle between a plane perpendicular to the center axis 24' of the upper mold member 24 and the transfer area 24b, and $\beta_2$ is an angle between the center axis 24' of the lower mold member 24 and the rotating center axis T' of the grinder T. In this case, a surface roughness $R_{max}$ of the transfer surface 24a not more than 0.1 μm and a surface precision not more than 5 newton rings, and a surface roughness $R_{max}$ of the transfer area 24b not more than 0.2 μm are attained, and a radius of curvature of a boundary line portion between the transfer surface 24a and the transfer area 24b is attained to be not more than 0.5 mm.

An operation of the molding apparatus is now explained.

First, an operation position of the cylinder 26 is set so that the spacing between the lower mold member 22 and the upper mold member 24 is set sufficiently larger than the desired thickness of the optical element. The cylinder 6 is also operate to set the vertical position of the cylindrical member 20 such that the material feeding opening 20a is just above the upper end surface of the lower mold member 22.

The interior of the space including the cavity of the cylindrical member 20, the interiors of the bellows 28 and 30 and the interiors of the pipes 21a, 21b, 21c and 21d may form an air tight closed system. The valves 40, 46 and 52 are initially closed and the air tight closed system is vacuumed to, for example, $1 \times 10^2$ Torr. Then, the valve 54 is closed and the valve 52 is opened, and nitrogen gas is introduced into the air tight closed system.

Then, the valve 52 is closed and the valve 44 is opened, and the material $G_1$ is fed from an external magazine (not shown) into the material feeding side atmosphere replacement portion 42, and the valve 44 is closed. The feeding of the material $G_1$ into the replacement portion 42 is detected by a sensor (not shown) and the control of the succeeding steps is sequentially carried out.

The glass material preform $G_1$ is of sphere shape having an equivalent volume to that of the desired optical element, and the surface thereof is a mirror surface. The interior of the atmosphere replacement portion 42 is deaired through the pipe 43 and the valve 40 is opened. An inclination is formed in the pipe 21a so as to gradually descend from the atmosphere replacement portion 42 to the cylindrical member 20 under this condition. The material $G_1$ is supplied into the mold cavity (on the lower mold member 22) by rolling.

In this step, the temperature of the lower mold member 22 and the upper mold member 24 are set to be lower than the glass transition temperature by means of the heaters 34 and 36, respectively. The temperature of the top of the cylindrical member 20, that is, the portion of the cylindrical member 20 in the vicinity of the heater 32 is maintained to be higher than the glass transition temperature of the material by means of the heater 32. This condition is maintained throughout the subsequent steps. Thus, a temperature distribution which is high at the top and low at the bottom is established in the cylindrical member 20 with respect to the longitudinal direction.

Then, the cylinder 6 is operated to move the cylindrical member 20 downward to position the mold cavity at the top of the cylindrical member (at a level corresponding to the heater 32). Since the top of the cylindrical member 20 is held at a higher temperature than those of the lower mold member 22 and the upper mold member 24, there are sufficient clearances between the inner surface of the cylindrical member 20, and the outer surface of the lower mold member 22 and the outer surface of the upper mold member 24, whereby the movement of the member 20 is done without difficulty.

The heaters 34 and 36 are controlled to increase the temperatures of the lower mold member 22 and the upper mold member 24 to a molding temperature which is higher than the glass transition temperature of the material $G_1$. The heating may be started simultaneously with the start of descending the cylindrical member 20, but the start of heating of the upper mold member 24 may be slightly later than the start of heating of the lower mold member 22.

Then, the cylinder 26 is operated to move the upper mold member 24 downward, and the material is pressed to form the optical element $G_2$. The pressing is maintained for an appropriate time. The pressing pressure may be, for example, 3 to 100 kg/cm$^2$ in surface pressure.

In order to keep the clearance between the inner surface of the cylindrical member 20 and the upper mold member 24 when the upper mold member 24 is moved for pressing, the start of heating of the upper mold member 24 may be slightly delayed from the start of heating of the lower mold member 22 and the pressing may be started when the temperature of the upper mold member 24 slightly exceeds the glass transition point of the material (it does not yet reach the temperature at the top of the cylindrical member 20).

The cylinder 26 has a displacement sensor so that the progress of the pressing is monitored based on the output of the sensor. When the output of the displacement sensor is saturated, it is determined that the material has been filled in the cavity.

On the completion of the pressing, the temperatures of the cylindrical member 20, the lower mold member 22 and the upper mold member 24 are substantially equal, the clearances between the inner surface of the cylindrical member 20, and the outer surface of the lower mold member 22 and the outer surface of the upper mold member 24 are sufficiently small, whereby the cavity is closed.

After the pressing has been maintained for the appropriate time, the pressing pressure by the cylinder 26 is removed and only the weight of the upper mold member 24 is applied downward. The heating of the lower mold member 22 and the upper mold member 24 by the heaters 34 and 36 are stopped and the temperatures of those mold members 22, 24 are set lower than the glass transition temperature.

Then, the cylinder 6 is operated to move the cylindrical member 20 upward. As a result, the influence of the heating of the heater 32 on the optical element $G_2$ is reduced, therefore, the temperature of the optical element $G_2$ is gradually decreased in cooperation with setting the temperatures of the lower mold member 22 and the upper mold member 24 to be lower than the glass transition temperature. The bottom of the cylindrical member 20 may be cooled by the cooler 33 as required. In this manner, the optical element $G_2$ is cooled to a take-out temperature.

In this step, since the temperatures of the lower mold member 22 and the upper mold member 24 are set lower than the temperature at the top of the cylindrical member 20, the clearances between the inner surface of the cylindrical member 20, and the outer surface of the lower mold member 22 and the outer surface of the upper mold member 24 are sufficient to assure the movement.

In this step, the heating by the heater 32 may be stopped, whereby the cooling time is shortened.

Then, the cylinder 26 is operated to move the upper mold member 24 upward. As a result, the optical element $G_2$ is pulled apart from the upper mold member 24 and positioned on the lower mold member 22.

Then, after the valve 46 is opened, the valve 52 is opened to introduce the nitrogen gas, whereby the optical element $G_2$ on the lower mold member 22 is removed and blown off to move through the pipe 21b to the atmosphere replacement portion 48 which has been deaired.

Then, the valves 46 and 52 are closed, and the valve 50 is opened to take out the optical element $G_2$. Then, the valve 50 is closed, and the atmosphere replacement portion 48 is deaired.

Then, the above steps are repeated to carry out the next press cycle.

An example of the manufacture of the optical lens by said press-molding method of the present invention is described below.

A sphere material consisting of optical glass SF8 and having a diameter of 11.85 mm was used as the mold material.

The lower mold member and the upper mold member have an outer dimension of 25 mm and are made of MoB ceramics processed by HIP, and have a thermal expansion coefficient of approximately $80 \times 10^{-7}/°C$. and an outer diameter precision and an eccentricity precision not more than 3 $\mu$m. A surface roughness $R_{max}$ of the transfer surfaces of the lower mold member and the upper mold member for forming the optical function planes is 0.05 $\mu$m, a surface precision is 3 newton rings and a surface roughness $R_{max}$ of the transfer areas for forming the bevelled portion is 0.1 $\mu$m.

The cylindrical member has a length of approximately 180 mm, is made of TiN cermet and has a thermal expansion coefficinet of approximately $45 \times 10^{-7}/°C$. The inner surface of the cylindrical member on which the lower mold member and the upper mold member slide, is well polished so that an out-of-roughness and an inner diameter variation are within 1 $\mu$m.

The temperatures of the lower mold member and the upper mold member in the stand-by state are 350° C. and the temperature in the vicinity of the heater at the top of the cylindrical member is 490° C.

The time required to deair the closed system to $1 \times 10^{-2}$ Torr and to fill the nitrogen gas to the closed system to the atmospheric pressure is within 30 seconds. When the atmosphere in the interior of the molding chamber of a conventional batch type apparatus for press-molding the similar glass to that of the present embodiment is replaced by the nitrogen gas, the replacement time is approximately 6 to 7 minutes. Accordingly, the time is significantly shortened in the present example.

The temperature of the lower mold member was set to 510° C. when the material was heated and pressed. The setting of the temperature was effected simultaneously with the start of the descending of the cylindrical member of FIG. 7. The set temperature was reached in approximately 22 seconds. The temperature of the upper mold member was also set to 510° C. but the setting was delayed by approximately 13 seconds from the setting of the lower mold member. As a result, smooth movement of the upper mold member was attained in the pressing step.

The pressing was started when the temperature of the upper mold member reached 450° C. which is slightly higher than the glass transition point 445° C., although it may be started when the temperature in the cavity reaches constant. The pressing pressure was 15 kg/cm².

The time required from the start of the pressing to the deformation of the material to the contour of the cavity was approximately 13 seconds. In order to make the temperature distribution of the optical element thus produced, the pressed state was further maintained for approximately 5 seconds.

Then, the application of the pressing force by the upper mold member was stopped, and the temperatures of the lower mold member and the upper mold member were set to 350° C.

The temperature at the bottom of the cylindrical member was approximately 200° C., and the air blow cooling was applied to that portion. It became possible to take out the molded material after about 20 seconds, and it was taken out by blowing the nitrogen gas. During this period, the cylindrical member and the upper mold member were moved upward.

The time required for the molding cycle was approximately one minute which is substantially shorter than the time (approximately one hour) required for one cycle in the conventional batch type apparatus.

In the above embodiment, the cylindrical member is vertically arranged and the lower mold member and the upper mold member are vertically arranged in the cylindrical member. However, the present invention is not limited to such arrangement. The direction of the cylindrical member may be appropriately set, and the lower mold member and the upper mold member need not be arranged vertically, so long as they are slidable in the cylindrical member. Therefore, the arrangement, for example, in which the lower and upper mold members are horizontally arranged, should be included within the scope of the present invention.

In accordance with the present invention, since the ring-shaped transfer portion for forming the bevelled surface of the optical element is formed on the outer periphery of the transfer surface for forming the optical function plane of at least one of the lower mold member and the upper mold member, the high precision bevelled surface can be formed in the optical element simultaneously upon the press-molding, and the shape precision of the molded optical element is not lowered even if the press-molding is repeated. Accordingly, the optical element with the bevelled surface can be manufactured at a low cost and a high speed.

Figure 6:
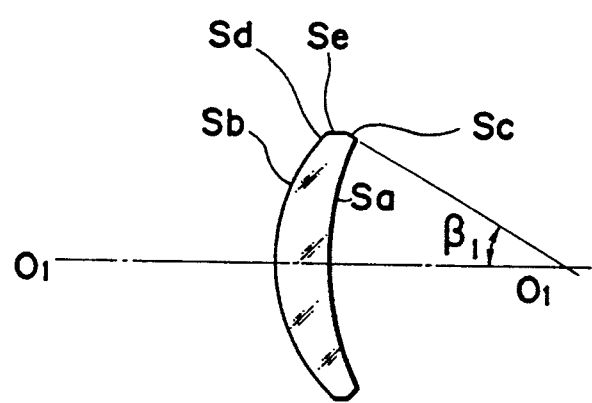
FIG. 6 shows an example of a lens of the present invention.

FIG. 6 shows a lens La manufactured by the apparatus and method shown in FIGS. 1 to 5.

Figure 7:
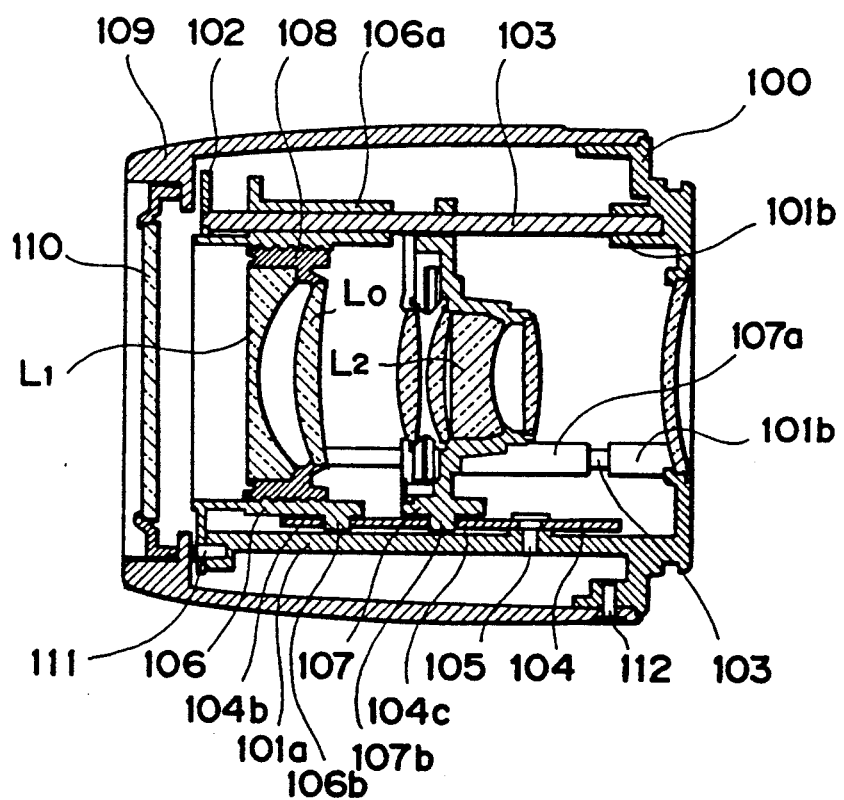
FIG. 7 shows a sectional view of a lens-barrel into which the lens of the present invention is assembled.

FIG. 7 shows a lens-barrel into which the lens La is assembled.

In FIG. 7, numeral 100 denotes a bayonet mount formed by injection molding with plastic, numeral 101a denotes a support member extending along an optical axis, which is integrally molded with the mount 100, numeral 101b denotes a rod press fit boss which is also integrally molded with the mount 100 and has a press fit aperture formed therein. Numeral 101c denotes a positioning projection formed at an end of the support member 101a. Numeral 102 denotes a guide rod holding plate having an aperture 102a for supporting one end of a guide rod 103. The guide rod 103 is supported so that the one end thereof is supported by the press fit boss 101b and the other end thereof is inserted into the aperture 102a of the plate 102. Numeral 104 denotes a cam plate, numeral 104a denotes a rotation center hole of the cam plate 104, numerals 104b and 104c denote cam grooves. Numeral 105 denotes a rotation shaft vis of the cam plate 104. Numeral 106 denotes a front lens drive frame, numeral 106a denotes a sleeve of the drive frame 106, numeral 106b denotes a cam pin which is integrally made with the drive frame 106.

Numeral 107 denotes a rear lens frame, numeral 107a denotes a sleeve which is integrally made with the lens frame 107, numeral 107b denotes a cam pin which is integrally made with the lens frame 107. Numeral 108 denotes a front lens holding frame, numeral 109 denotes an outer mounting tube, numeral 110 denotes a protection glass, numerals 111 and 112 denote vises. L1 denotes front lenses and L2 denote rear lenses.

The one end of the guide rod 103 is firmly pressed into the aperture of the boss 110b of the bayonet mount 100 so that it is not readily taken off. The plate 102, which is correctly positioned according to the relationship to the aperture 102b to which the positioning projection 101c is inserted, is fixed to the end of the support member 101a of the bayonet mount 100 by the vis 111. The other end of the guide rod 103 is inserted into the aperture 102a of the plate 102 and supported. The center hole 104a of the cam plate 104 is supported by the vis 105 which is secured to the support member 101a, and the cam plate 104 is rotatably around the bis 105.

The front lens drive frame 106 holding the inner periphery of the front lens holding frame 108 by a helicoid screw is supported to the guide rod 103 by the sleeve 106 to permit to move along the optical axis The sleeve 107a of the rear lens frame 107 is also held so that the sleeve 107a moves along the optical axis by the guide rod 103. The cam pins 106b and 107b extending from the front lens holding frame 108 and the rear lens holding frame 107, respectively, is fitted into the cam grooves 104b and 104c of the cam plate 104 without the loose so that the lens frames 108 and 107 move along the optical axis by the action of the cam as the cam plate 104 is rotated.

The lens $L_O$ shown in FIG. 6 has optical function areas Sb and Sa which have been transferred and molded by the transfer areas 22a and 24a of the optical function areas of the lens molding cavity of the upper and lower mold members 24 and 22, and a transfer area of an engagement portion to the lens-barrel. The engagement portion of the lens La comprises an engagement portion Sc formed by the transfer area 24b shown in FIG. 1, an engagement portion Sd formed by the transfer area 22b and a transfer area Se formed by the cylindrical member 20.

The engagement portion Se is a parallel plane to an optical axis $O_1$ of the lens $L_O$. The engagement portion Sc has an angle of inclination $\beta_1$ relative to the optical axis $O_1$.

The lens $L_O$ having the engagement portions Sd, Se and Sc shown in FIG. 6 are mounted in the lens-barrel shown in FIG. 7.

In FIG. 7, the second lens in the front lenses $L_1$ corresponds to the lens $L_O$. The lens $L_O$ is held by the lens holding frame 108 made of resin.

Figure 8:
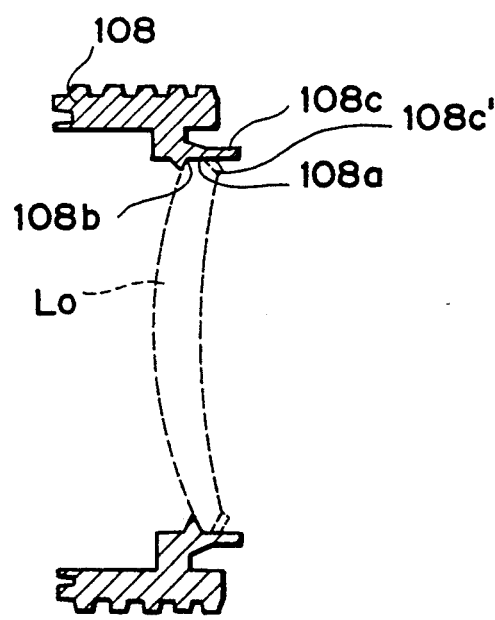
FIG. 8 illustrates holding state of the lens of a lens holding frame.

FIG. 8 shows a secured state of the lens $L_O$ by the lens holding frame 108. The engagement portion Se of the lens $L_O$ is fitted to the inner periphery 108a of the frame 108, and the engagement portion Sd of the lens abuts against the inclined surface 108b of the holding frame 108 against which the lens $L_O$ is abutted.

The lens $L_O$ is positioned on the optical axis of the lens-barrel while it is fitted to the inner periphery of the holding frame 108 and abutted against the inclined surface 108b. A lens retainer 108c which extends in parallel with the optical axis is formed at an end of an inner periphery fit area 108a of the holding frame 108. The lens retainer 108c is bent inward as shown by dotted line 108c while the lens $L_O$ s urged to the holding frame to fix the lens $L_O$ to the holding frame. The lens retainer 108c may be bent by heating means such as a soldering iron.

In accordance with the present invention, the lens is produced by preparing a glass material, preparing a molding apparatus for press-molding the glass material into a lens shape, preheating the glass material or heating the glass material in the molding apparatus thereby to soften the glass material and molding the glass material into the lens shape by the molding apparatus. An engagement portion of the molded lens to a mounting member on which the lens is to be mounted, is molded in the molding process simultaneously with the molding of an optically function portion of the lens. Accordingly, the post-machining of the engagement portion for mounting the lens in the lens-barrel is not necessary. Further, since the engagement portion which is held by the lens holding member and the optical function portion of the lens are simultaneously molded, the fixing position of the lens on the optical axis can be defined by the engagement portion and the post-machining is not necessary.

What is claimed is:

1. A lens produced by a method comprising the steps of:

preparing a glass material;

preparing a molding apparatus having mold members for press-molding said glass material of said lens into a lens shape, said mold members comprising an engaging part for forming an optical function surface of the lens and an engagement portion formed similar to a mounting member on which said lens is to be mounted, and said engaging part comprising a cavity having a face with an angle inclined to an optical axis of said lens to be molded;

preheating said glass material or heating said glass material in said molding apparatus to soften the glass material; and press-molding said softened glass material to form the optical function surface and said engagement portion of the lens.

2. A lens according to claim 1, wherein said lens if fixed by a lens holding member of a lens-barrel comprising the mounting member in the lens-barrel.

3. A lens according to claim 1, wherein a portion of said lens transferred by said cavity forms a retainer of said lens holding member.

4. A lens according to claim 1, wherein said mold member further comprises a first mold member for transferring said optical function surface and a second mold member for transferring only a part of said engagement portion.

* * * * *

UNITED STATES PATENT AND TRADEMARK OFFICE
CERTIFICATE OF CORRECTION

PATENT NO. : 5,227,917
DATED : July 13, 1993
INVENTOR(S) : KUBO HIROYUKI, ET AL.

It is certified that error appears in the above-indentified patent and that said Letters Patent is hereby corrected as shown below: Title page:

Item:
[57] ABSTRACT:
    line 11, "function" should read --functional--.

COLUMN 6:
    line 64, "material" should read --preform of the glass material to be molded--.

COLUMN 12:
    line 10, "if" should read --is--.

COLUMN 10:
    line 13, "axis" should read --axis.--.

Signed and Sealed this

Twenty-eighth Day of June, 1994

Attest:

BRUCE LEHMAN

Attesting Officer    Commissioner of Patents and Trademarks